(12) United States Patent
Zhang et al.

(10) Patent No.: US 11,044,062 B2
(45) Date of Patent: Jun. 22, 2021

(54) METHODS TO DETERMINE PARAMETERS RELATED TO PHASE TRACKING REFERENCE SIGNALS (PT-RS) BASED ON A TYPE OF RADIO NETWORK TEMPORARY IDENTIFIER (RNTI)

(71) Applicant: Apple Inc., Cupertino, CA (US)

(72) Inventors: Yushu Zhang, Beijing (CN); Gang Xiong, Beaverton, OR (US); Yujian Zhang, Beijing (CN); Guotong Wang, Beijing (CN)

(73) Assignee: Apple Inc., Cupertino, CA (US)

(*) Notice: Subject to any disclaimer, the term of this patent is extended or adjusted under 35 U.S.C. 154(b) by 69 days.

(21) Appl. No.: 16/510,077

(22) Filed: Jul. 12, 2019

(65) Prior Publication Data

US 2020/0008270 A1  Jan. 2, 2020

Related U.S. Application Data

(63) Continuation of application No. PCT/CN2019/071188, filed on Jan. 10, 2019.

(Continued)

(51) Int. Cl.
*H04L 5/00* (2006.01)
*H04L 1/00* (2006.01)
*H04L 27/26* (2006.01)
*H04W 88/06* (2009.01)
*H04W 76/11* (2018.01)
*H04W 76/27* (2018.01)
*H04L 5/10* (2006.01)

(Continued)

(52) U.S. Cl.
CPC .......... *H04L 5/0048* (2013.01); *H04L 1/0004* (2013.01); *H04L 5/0051* (2013.01); *H04L 5/0091* (2013.01); *H04L 27/2613* (2013.01); *H04W 88/06* (2013.01); *H04L 1/0061* (2013.01); *H04L 5/10* (2013.01); *H04W 72/0466* (2013.01); *H04W 76/11* (2018.02); *H04W 76/27* (2018.02); *H04W 80/08* (2013.01)

(58) Field of Classification Search
CPC ... H04L 5/0048; H04L 5/0091; H04L 5/0051; H04L 27/2613; H04L 1/0004; H04W 88/06
See application file for complete search history.

(56) References Cited

U.S. PATENT DOCUMENTS

2019/0165910 A1* 5/2019 Lee .................... H04L 5/0051
2019/0199487 A1* 6/2019 Ko ...................... H04B 7/0417
(Continued)

*Primary Examiner* — Min Jung
(74) *Attorney, Agent, or Firm* — Kowert Hood Munyon Rankin and Goetzel PC

(57) ABSTRACT

Embodiments of a User Equipment (UE), Next Generation Node-B (gNB) and methods of communication are generally described herein. The UE may receive a physical downlink control channel (PDCCH) that schedules a physical downlink shared channel (PDSCH), wherein a cyclic redundancy check (CRC) of the PDCCH is scrambled by a radio network temporary identifier (RNTI). In some cases, if the RNTI that scrambles the PDCCH is a modulation coding scheme (MCS) cell RNTI (MCS-C-RNTI), cell RNTI (C-RNTI), or a configured scheduling RNTI (CS-RNTI), the UE may determine that: one or more PT-RSs are present in the PDSCH, a time density parameter of the PT-RSs is equal to one, and a frequency density of the PT-RSs is equal to two.

20 Claims, 11 Drawing Sheets

Related U.S. Application Data

(60) Provisional application No. 62/697,865, filed on Jul. 13, 2018.

(51) Int. Cl.
    *H04W 72/04*     (2009.01)
    *H04W 80/08*     (2009.01)

(56) References Cited

U.S. PATENT DOCUMENTS

| | | | |
|---|---|---|---|
| 2019/0222385 A1* | 7/2019 | Hessler | H04L 5/0094 |
| 2019/0296877 A1* | 9/2019 | Zhang | H04W 72/042 |
| 2019/0394758 A1* | 12/2019 | Cheng | H04L 1/0061 |
| 2020/0052944 A1* | 2/2020 | Zhang | H04W 72/04 |
| 2020/0196332 A1* | 6/2020 | Yokomakura | H04W 72/1268 |
| 2020/0220675 A1* | 7/2020 | Lee | H04L 5/0026 |
| 2020/0287687 A1* | 9/2020 | Li | H04L 5/0094 |

\* cited by examiner

METHODS TO DETERMINE PARAMETERS RELATED TO PHASE TRACKING REFERENCE SIGNALS (PT-RS) BASED ON A TYPE OF RADIO NETWORK TEMPORARY IDENTIFIER (RNTI)

PRIORITY CLAIM

This application claims priority under 35 USC 119(e) to U.S. Provisional Patent Application Ser. No. 62/697,865, filed Jul. 13, 2018, and is a continuation of International Application No. PCT/CN2019/071188, filed Jan. 10, 2019, both of which are incorporated herein by reference in their entirety.

TECHNICAL FIELD

Embodiments pertain to wireless networks. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to determination of parameters related to phase tracking reference signals (PT-RSs), including determination based on a radio network temporary identifier (RNTI).

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
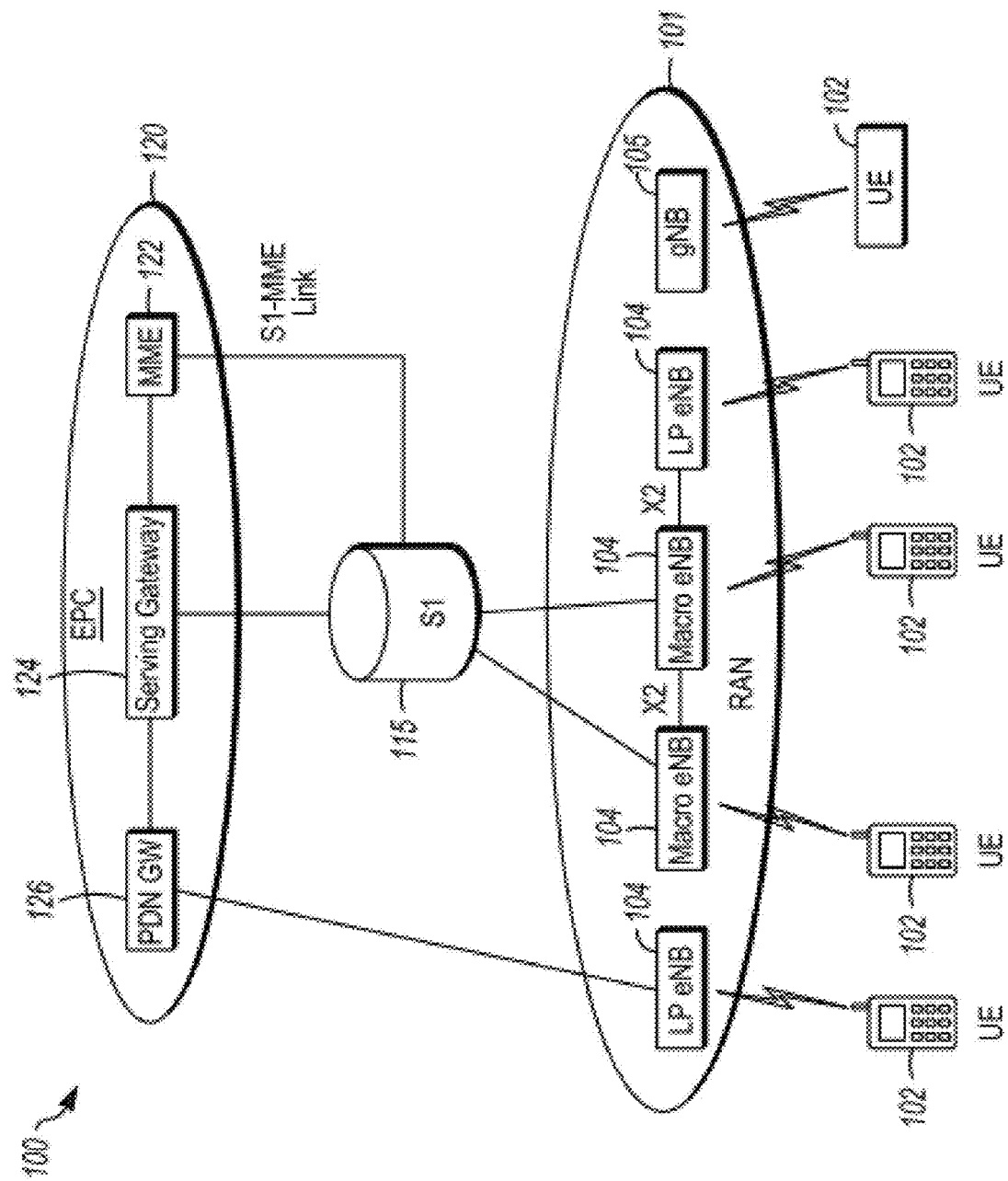
FIG. 1A is a functional diagram of an example network in accordance with some embodiments.
Figure 1B:
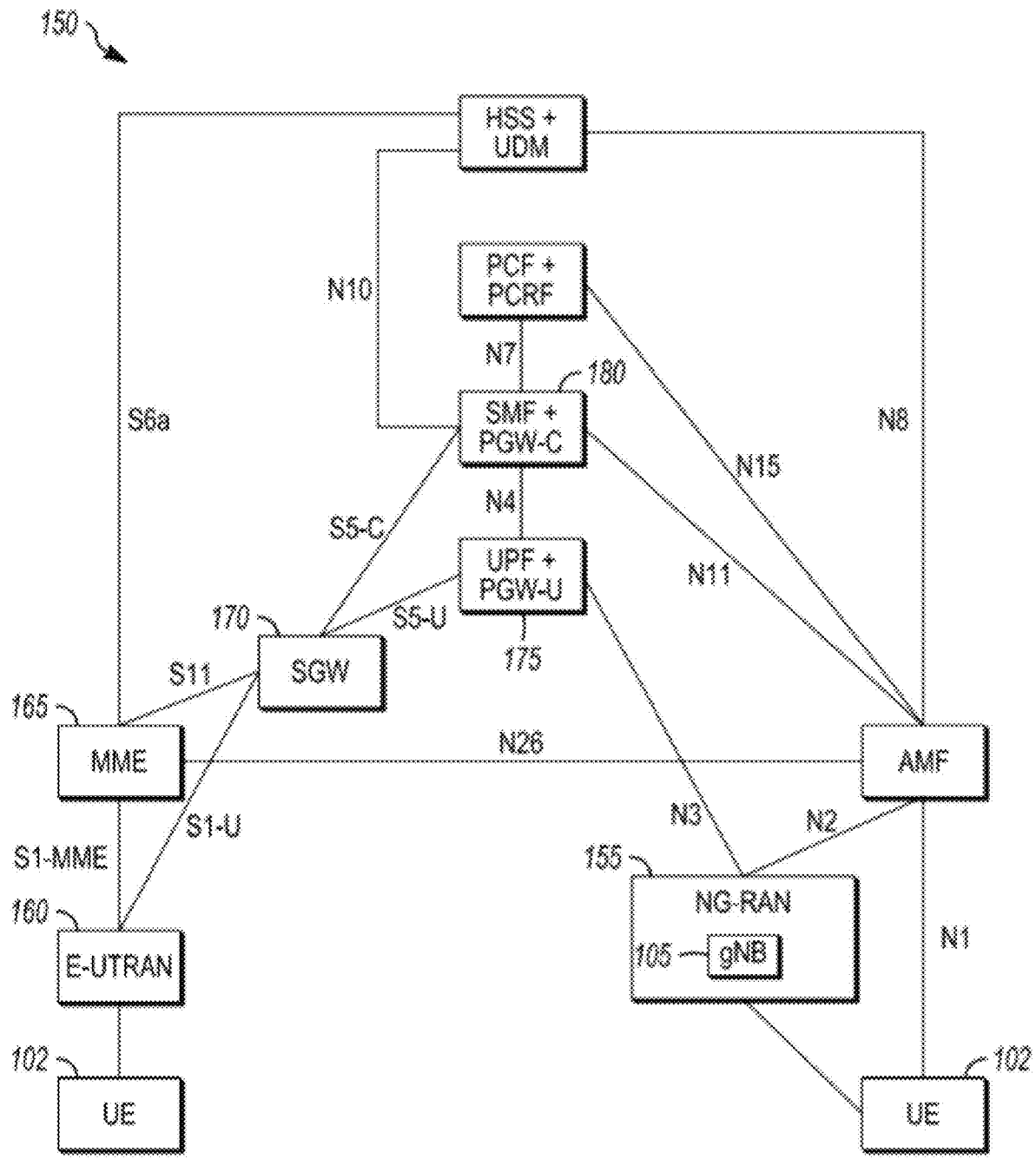
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105, and/or eNBs 104 may be configured to operate in accordance with an NR protocol and/or NR techniques. References to a UE 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
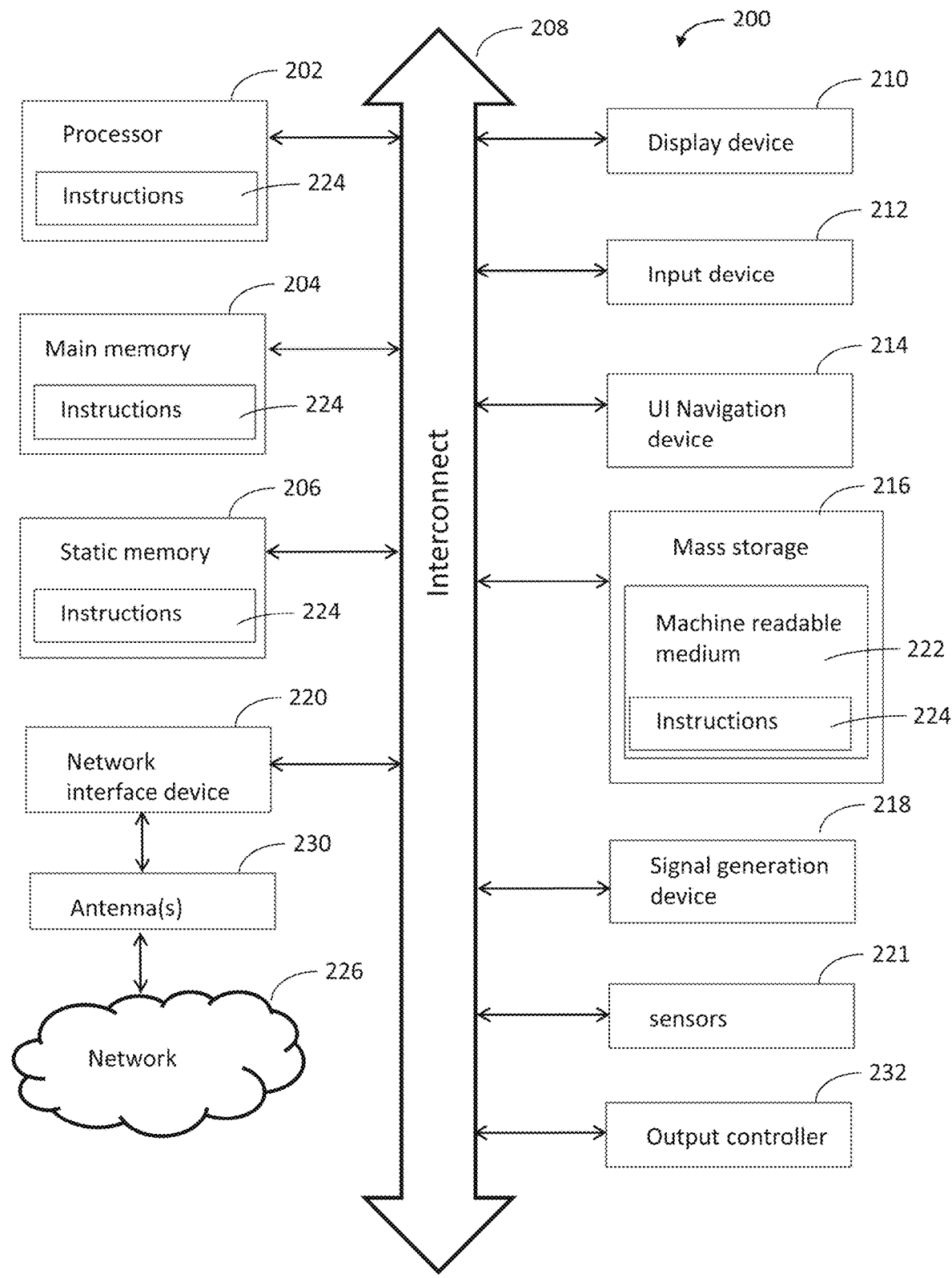
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
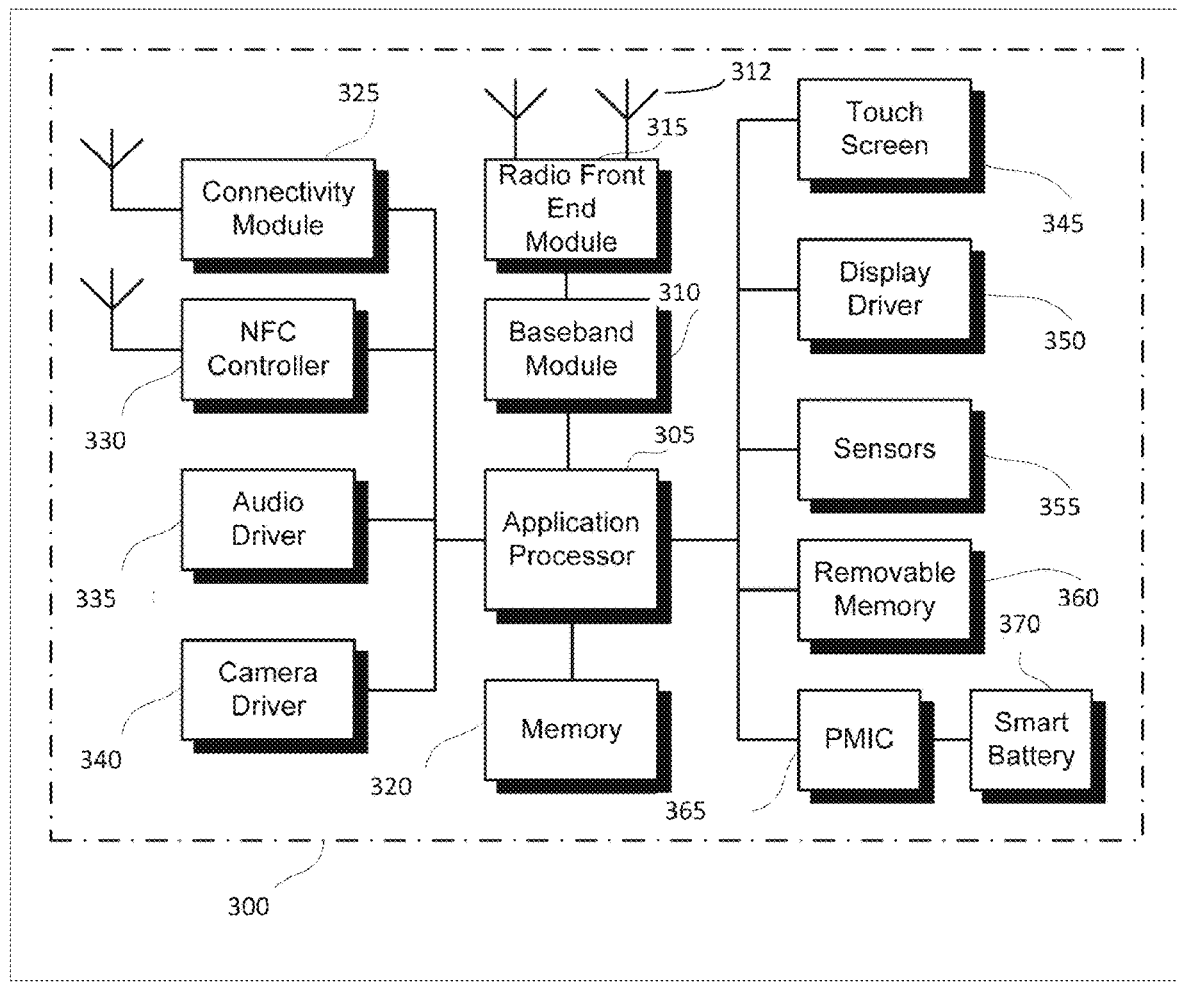
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
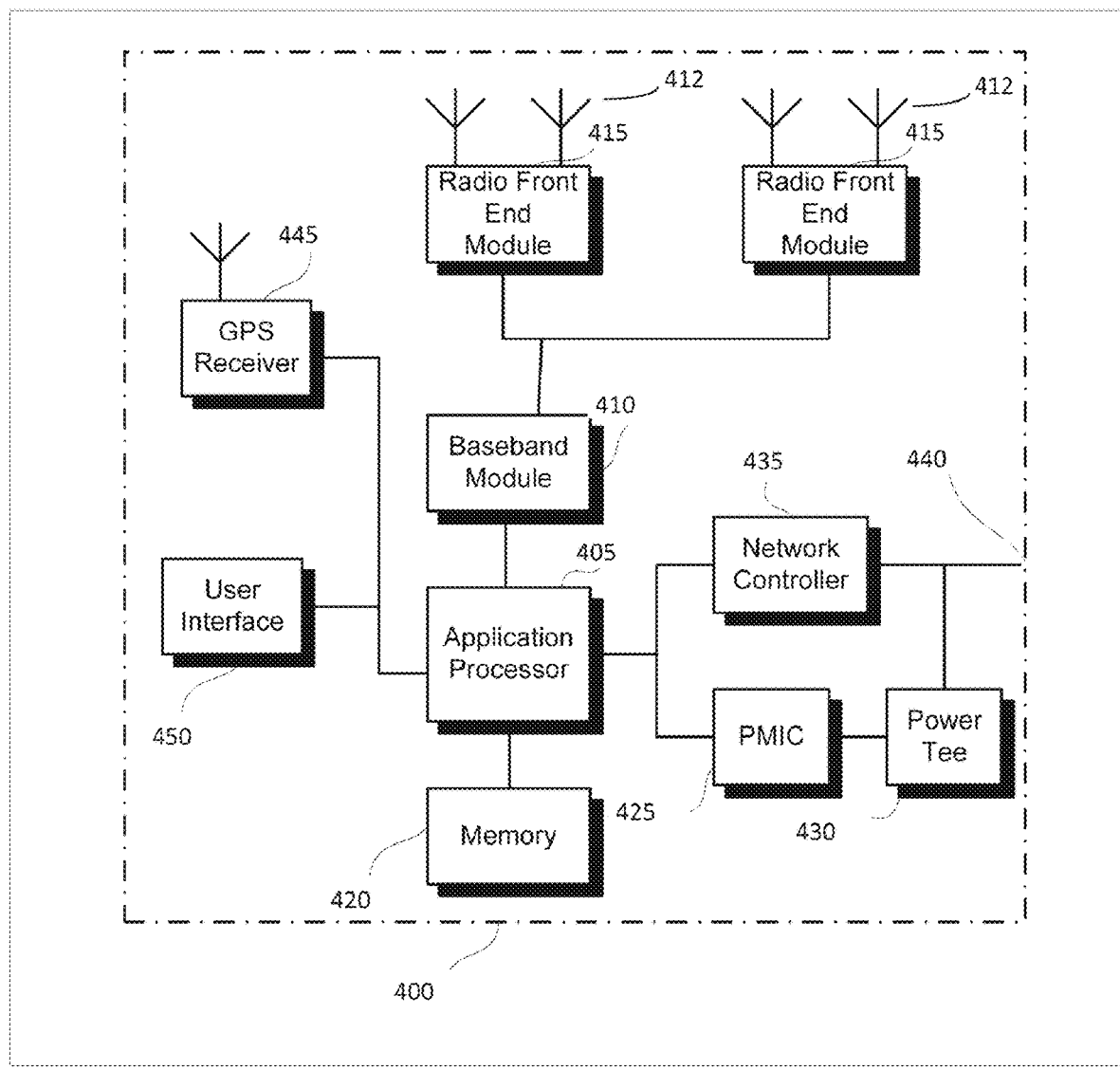
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
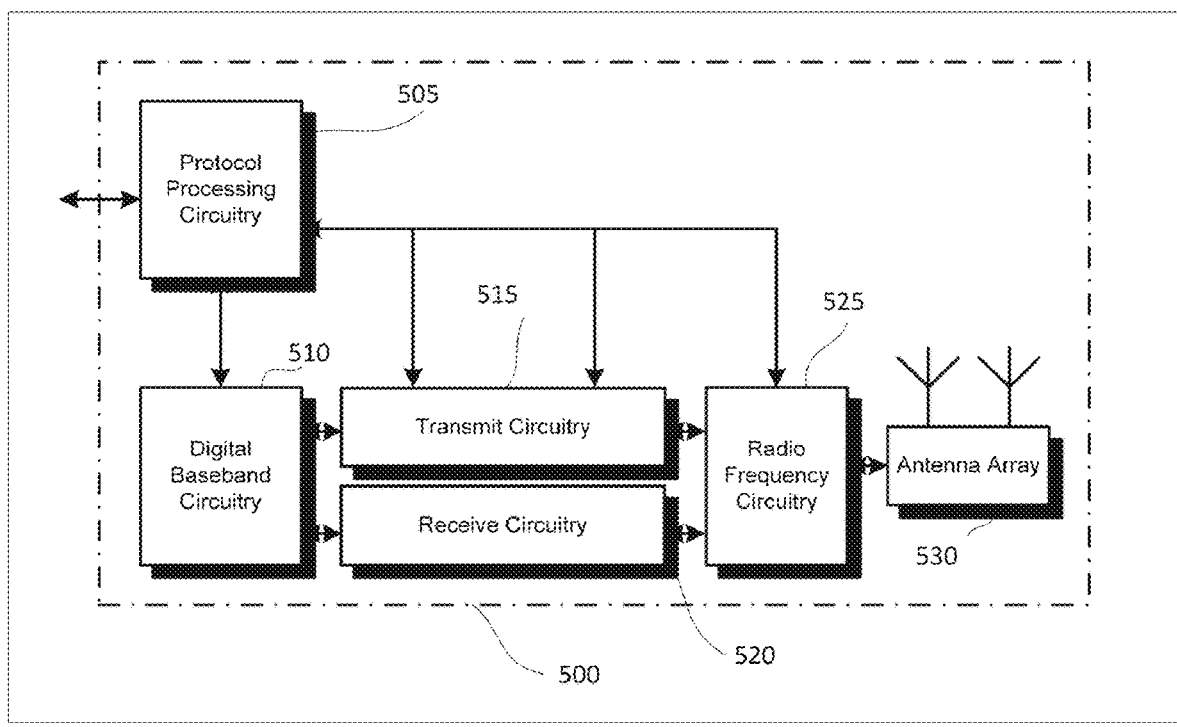
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARD) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
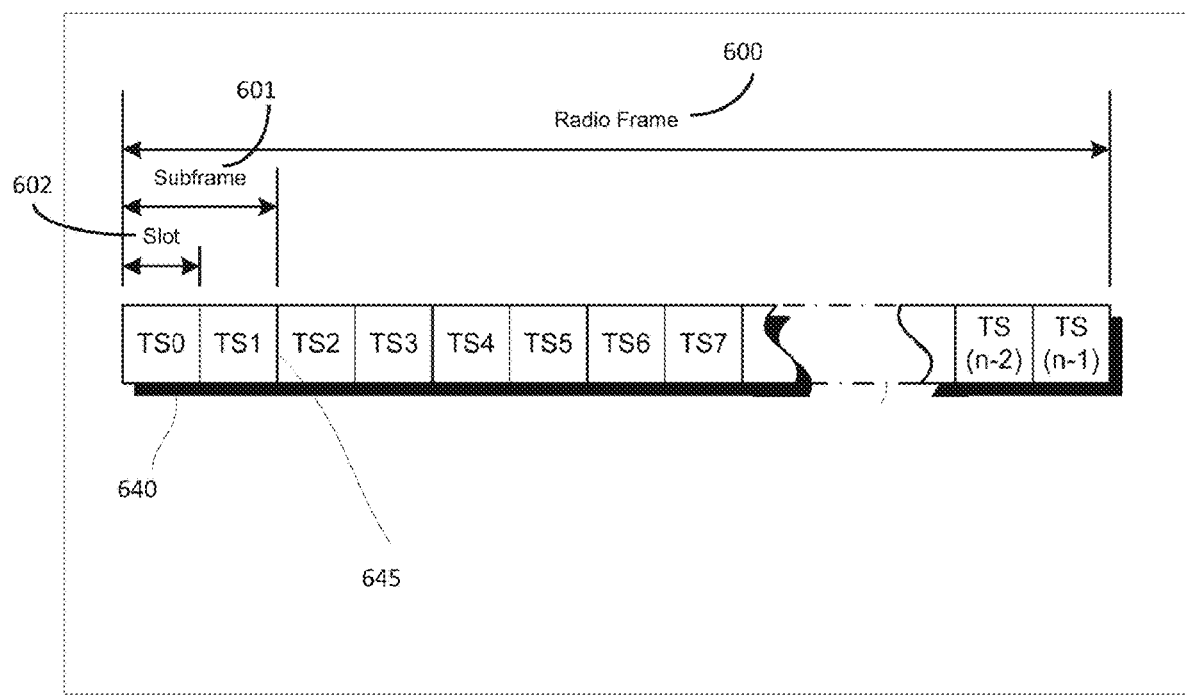
FIG. 6 illustrates an example of a radio frame structure in accordance with some embodiments.
Figure 7:
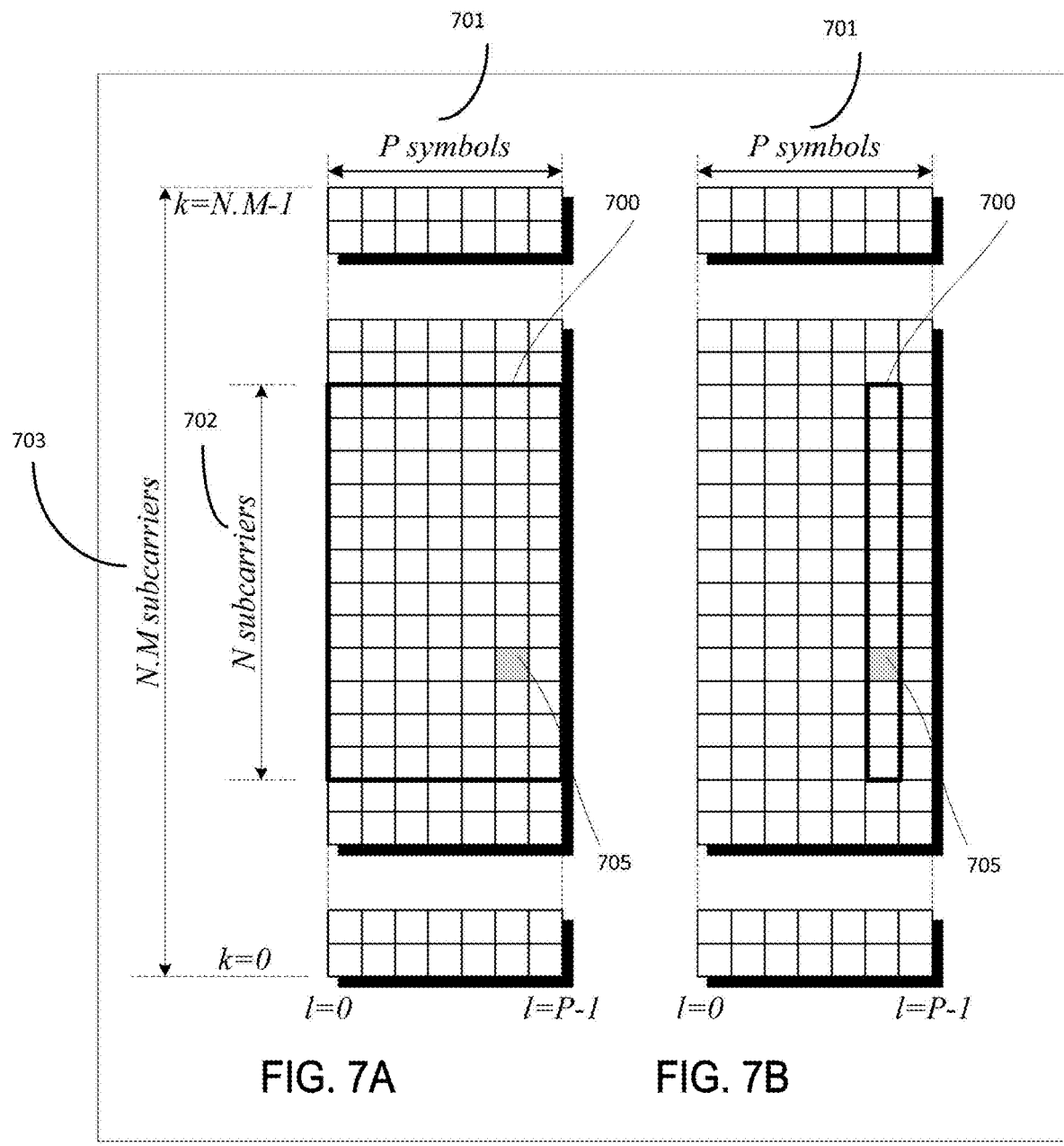
FIG. 7A and FIG. 7B illustrate example frequency resources in accordance with some embodiments.

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a subcomponent of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, 1) where k is the index number of subcarrier, in the range 0 to N.M—1 (as indicated by 703), where N is the number of subcarriers in a resource block, and M is the number of resource blocks spanning a component carrier in the frequency domain.

In accordance with some embodiments, the UE 102 may receive one or more radio resource control (RRC) messages that include: a Demodulation Reference Signal (DM-RS) Downlink Configuration (DMRS-DownlinkConfig) information element (IE), and a Phase Tracking Reference Signal (PT-RS) Downlink Configuration (PTRS-DownlinkConfig) IE. The UE 102 may receive a physical downlink control channel (PDCCH) that schedules a physical downlink shared channel (PDSCH), wherein a cyclic redundancy check (CRC) of the PDCCH is scrambled by a radio network temporary identifier (RNTI). If the UE 102 is configured with a higher layer parameter phase TrackingRS in the DMRS-DownlinkConfig IE; and if neither of higher layer parameters timeDensity and frequencyDensity are configured by the PTRS-DownlinkConfig IE; and if the RNTI that scrambles the PDCCH is a modulation coding scheme (MCS) cell RNTI (MCS-C-RNTI), cell RNTI (C-RNTI), or a configured scheduling RNTI (CS-RNTI), the UE 102 may determine that: one or more PT-RSs are present in the PDSCH; a time density parameter of the PDSCH is equal to one, indicating that one symbol per PDSCH includes a PT-RS; and a frequency density of the PT-RSs is equal to two, indicating that one resource element (RE) per two resource blocks (RBs) includes a PT-RS. These embodiments are described in more detail below.

Figure 8:
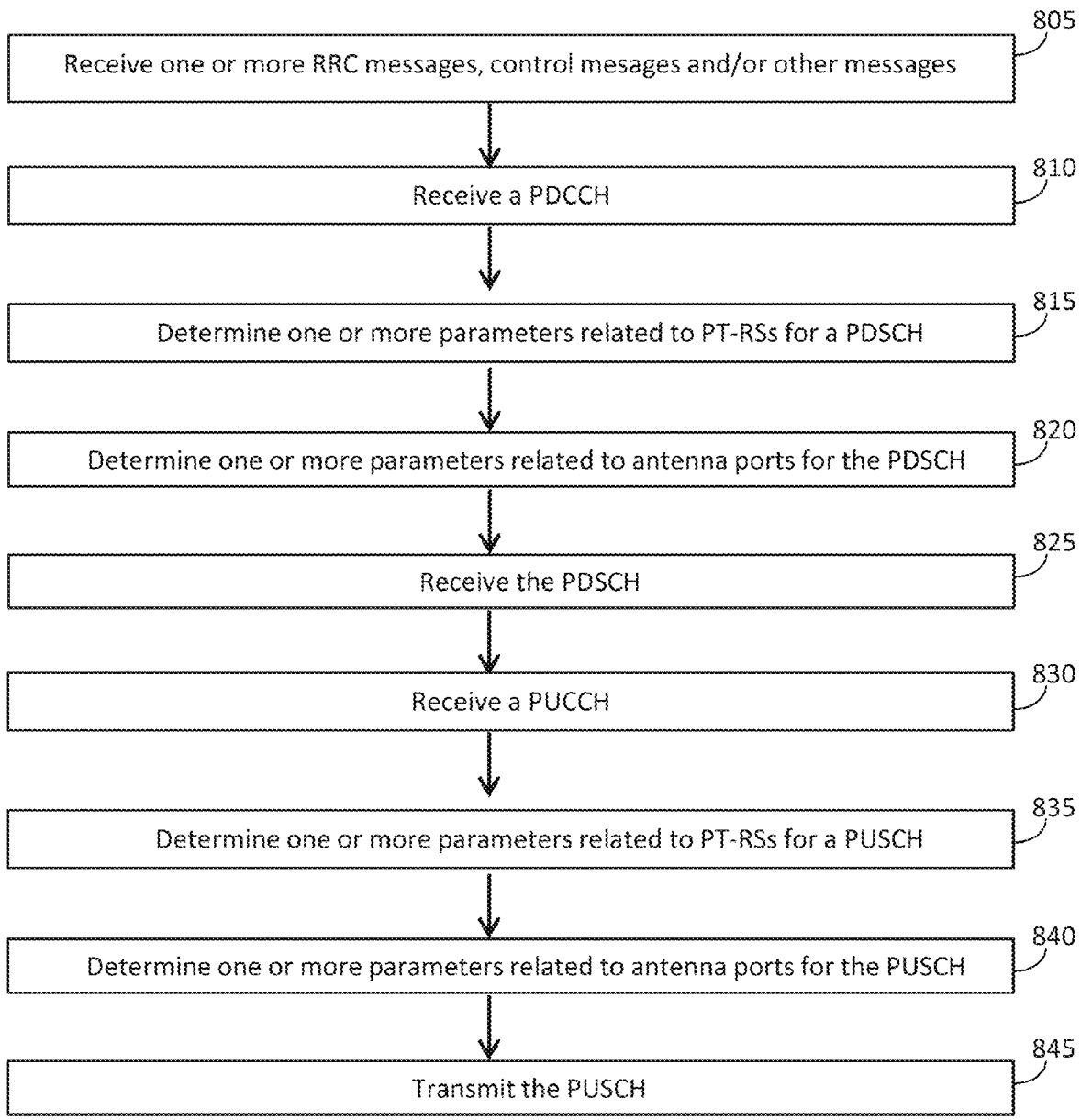
FIG. 8 illustrates the operation of a method of communication in accordance with some embodiments.
Figure 9:
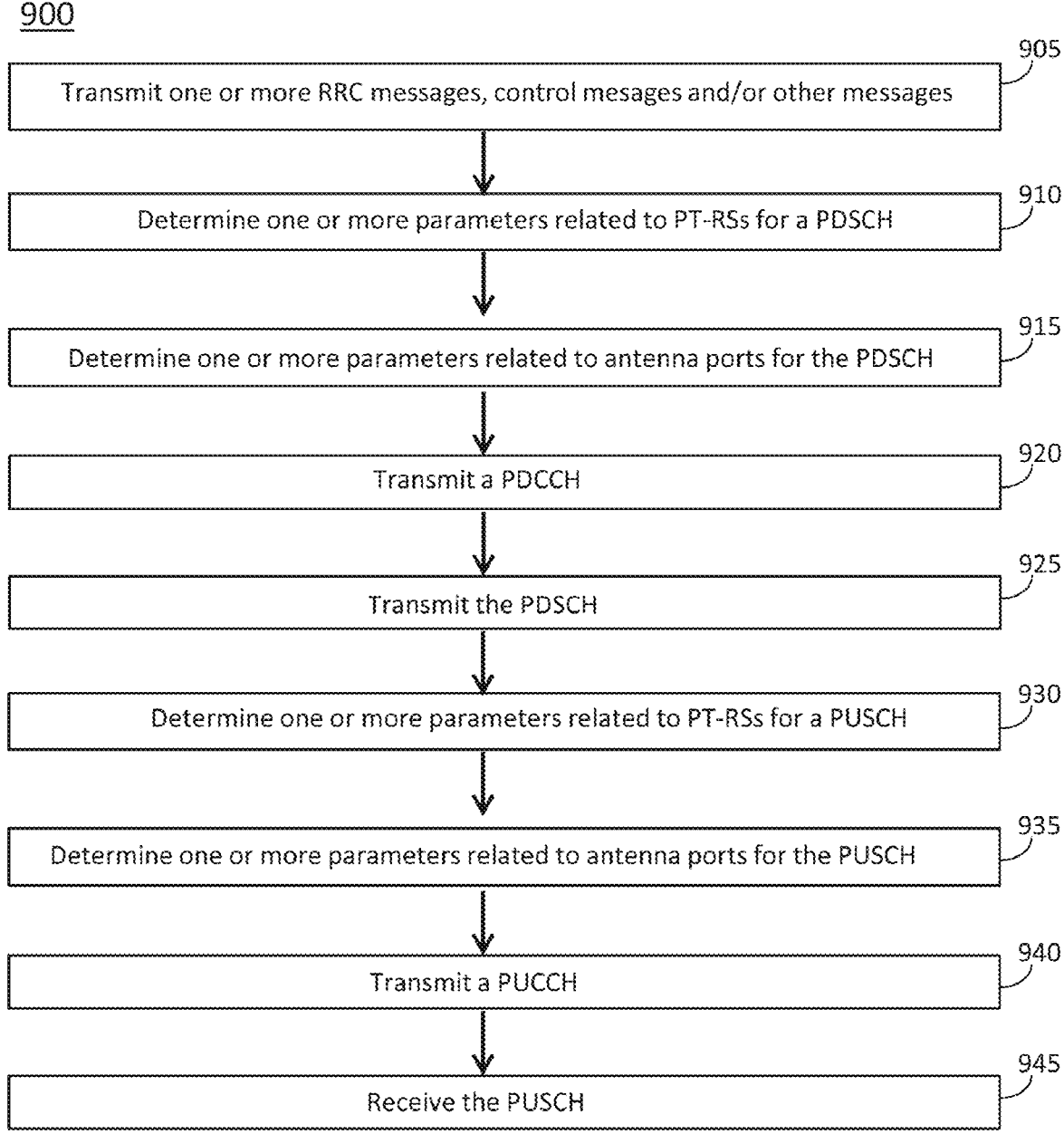
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, a UE 102 may perform one or more operations of the method 800, but embodiments are not limited to performance of the method 800 and/or operations of it by the UE 102. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the gNB 105 may perform an operation that may be the same as, similar to, reciprocal to and/or related to an operation of the method 800, in some embodiments.

In some embodiments, a gNB 105 may perform one or more operations of the method 900, but embodiments are not limited to performance of the method 900 and/or operations of it by the gNB 105. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900. In a non-limiting example, the UE 102 may perform an operation that may be the same as, similar to, reciprocal to and/or related to an operation of the method 900, in some embodiments. In another non-limiting example, the eNB 104 may perform an operation that may be the same as, similar to, reciprocal to and/or related to an operation of the method 900, in some embodiments It should be noted that one or more operations of one of the methods 800, 900 may be the same as, similar to and/or reciprocal to one or more operations of the other method. For instance, an operation of the method 800 may be the same as, similar to and/or reciprocal to an operation of the method 900, in some embodiments. In a non-limiting example, an operation of the method 800 may include reception of an element (such as a frame, block, message and/or other) by the UE 102, and an operation of the method 900 may include transmission of a same element (and/or similar element) by the gNB 105. In some cases, descriptions of operations and techniques described as part of one of the methods 800, 900 may be relevant to the other method.

Discussion of various operations, techniques and/or concepts regarding one of the methods 800, 900 and/or other method may be applicable to one of the other methods, although the scope of embodiments is not limited in this respect. Such operations, techniques and/or concepts may be related to control signaling, PDCCH, PDSCH, PUCCH, PUSCH, RNTI, MCS-C-RNTI, C-RNTI, CS-RNTI, SP-CSI-RNTI, PT-RSs, DM-RSs, and/or other.

The methods 800, 900 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In addition, embodiments are not limited by references herein (such as in descriptions of the methods 800, 900 and/or other descriptions herein) to generation, encoding, decoding, detection and/or other processing of elements. In some embodiments, such elements may be transmitted, received and/or exchanged.

In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. Embodiments are not limited to usage of those elements, however. In some embodiments, other elements may be used, including other element(s) in a same standard/protocol, other element(s) in another standard/protocol and/or other. In addition, the scope of embodiments is not limited to usage of elements that are included in standards.

In some embodiments, the UE 102 may be arranged to operate in accordance with an NR protocol. In some embodiments, the UE 102 may be configured to operate in accordance with an ultra-reliable low-latency communication (URLLC) technique. In some embodiments, the gNB 105 may be arranged to operate in accordance with an NR protocol. In some embodiments, the UE 102 may be configured to operate in accordance with a URLLC technique.

At operation 805, the UE 102 may receive one or more radio resource control (RRC) messages, control message, and/or other messages. In some embodiments, the UE 102 may receive the one or more RRC messages, control messages and/or other messages from the gNB 105, although the scope of embodiments is not limited in this respect.

In some embodiments, the one or more RRC messages, control messages and/or other messages may be related to one or more of: DM-RSs, PT-RSs, Radio Network Temporary Identifiers (RNTIs), and/or other.

In some embodiments, the UE 102 may receive one or more RRC messages. The one or more RRC messages may include one or more of: a Demodulation Reference Signal (DM-RS) Downlink Configuration (DMRS-DownlinkConfig) information element (IE); a Phase Tracking Reference Signal (PT-RS) Downlink Configuration (PTRS-DownlinkConfig) IE; one or more other IEs; and/or other. In a non-limiting example, the DMRS-DownlinkConfig IE may be configurable to include a higher layer parameter phaseTrackingRS and/or other. In some embodiments, the PTRS-DownlinkConfig IE may be configurable to include one or more of: the higher layer parameter timeDensity; the higher layer parameter frequencyDensity; and/or other.

At operation 810, the UE 102 may receive a physical downlink control channel (PDCCH). In some embodiments, the UE 102 may receive the PDCCH from the gNB 105, although the scope of embodiments is not limited in this respect. In some embodiments, the PDCCH may schedule a PDSCH. In some embodiments, the PDCCH may include information related to the PDSCH, including but not limited to time resources for the PDSCH, frequency resources for the PDSCH, modulation coding scheme (MCS) index for the PDSCH, and/or other parameter(s). In some embodiments, the PDCCH may include other information that may not necessarily be related to the PDSCH.

In some embodiments, a cyclic redundancy check (CRC) of the PDCCH may be scrambled by a radio network temporary identifier (RNTI). Different RNTIs may be used, including but not limited to a modulation coding scheme (MCS) cell RNTI (MCS-C-RNTI), a cell RNTI (C-RNTI), a configured scheduling RNTI (CS-RNTI), and/or other.

In some embodiments, the MCS-C-RNTI may be a unique UE identifier used to indicate usage, for the PDSCH and/or physical uplink shared channel (PUSCH), of an alternative MCS table based on 64 level quadrature amplitude modulation (64QAM). In a non-limiting example, the alternative MCS table may be "MCS Table 3" described herein. In some embodiments, the alternative MCS table may be selected from a plurality of candidate MCS tables that includes "MCS Table 1," "MCS Table 2," and "MCS Table 3." The plurality of candidate MCS tables may be included in a 3GPP standard and/or NR standard, in some embodiments. The scope of embodiments is not limited to any of the following: usage of "MCS Table 3" as the alternative MCS table; usage of three candidate MCS tables; usage of "MCS Table 1," "MCS Table 2," and "MCS Table 3" as the candidate MCS tables; and/or other.

At operation 815, the UE 102 may determine one or more parameters related to phase tracking reference signals (PT-RSs) for a physical downlink shared channel (PDSCH). At operation 820, the UE 102 may determine one or more parameters related to antenna ports for the PDSCH.

In some embodiments, if the UE 102 is configured with the higher layer parameter phaseTrackingRS in the DMRS-DownlinkConfig IE; and if neither of the higher layer parameters timeDensity and frequencyDensity are configured by the PTRS-DownlinkConfig IE; and if the RNTI that scrambles the PDCCH is the MCS-C-RNTI, the C-RNTI, or the CS-RNTI, the UE 102 may determine one or more of the following: a) that one or more PT-RSs are present in the PDSCH, b) that a time density parameter of the PT-RSs is equal to one, and c) that a frequency density parameter of the PT-RSs is equal to two. Embodiments are not limited to the example numbers/values given above. Other numbers/values may be used, in some embodiments.

In some embodiments, the time density parameter may be indicated by "$L_{PT\text{-}RS}$", which may be included in a 3GPP standard and/or other standard. In some embodiments, the time density parameter and/or $L_{PT\text{-}RS}$ may indicate a number of symbols of the PDSCH that include at least one PT-RS. In some embodiments, a time density of the PT-RSs in the PDSCH may be equal to $L_{PT\text{-}RS}$ PT-RSs per PDSCH. The scope of embodiments is not limited to usage of $L_{PT\text{-}RS}$ as the time density parameter, and is also not limited to usage of parameters that are included in a standard. In addition, embodiments are not limited to the time density parameter as described above. In some embodiments, the time density parameter may indicate a density of PT-RSs in time using any suitable time units, ratios and/or other aspects.

In some embodiments, the frequency density parameter may be indicated by "$K_{PT\text{-}RS}$", which may be included in a 3GPP standard and/or other standard. In some embodiments, the frequency density parameter and/or $K_{PT\text{-}RS}$ may indicate a value for which, in the PDSCH, one RE per $K_{PT\text{-}RS}$ RBs includes a PT-RS. In some embodiments, a frequency density of the PT-RSs (in terms of REs per RB that include a PT-RS) may be equal to one RE per $K_{PT\text{-}RS}$ RBs. The scope of embodiments is not limited to usage of $K_{PT\text{-}RS}$ as the frequency density parameter, and is also not limited to usage of parameters that are included in a standard. In addition, embodiments are not limited to the frequency density parameter as described above. In some embodiments, the frequency density parameter may indicate a density of PT-RSs in frequency using any suitable frequency units, ratios and/or other aspects.

In addition, some of the descriptions above (and elsewhere herein) for the time density of PT-RSs in the PDSCH, the time density parameter of PT-RSs in the PDSCH, the frequency density of PT-RSs in the PDSCH and/or the frequency density parameter of PT-RSs in the PDSCH may be applicable to similar concepts for the PUSCH, although the scope of embodiments is not limited in this respect. For instance, a time density of PT-RSs in the PUSCH, a time density parameter of PT-RSs in the PUSCH, a frequency density of PT-RSs in the PUSCH and/or a frequency density parameter of PT-RSs in the PUSCH may be defined in a similar manner as corresponding elements for the PDSCH, in some embodiments.

In some embodiments, if the UE 102 is configured with the higher layer parameter phaseTrackingRS in the DMRS-DownlinkConfig IE; and if either or both of the higher layer parameters timeDensity and frequencyDensity are configured by the PTRS-DownlinkConfig IE; and if the RNTI that scrambles the PDCCH is the MCS-C-RNTI, the C-RNTI, or the CS-RNTI, the presence of antenna ports and a pattern of the antenna ports are a function of a scheduled MCS of a corresponding codeword of the PDSCH and a scheduled bandwidth in a corresponding bandwidth part.

In some embodiments, the UE 102 may determine a dynamic presence of the PT-RSs based on the type of RNTI that scrambles the PDCCH. In some embodiments, the UE 102 may determine a number of antenna ports for the PT-RSs based on the type of RNTI that scrambles the PDCCH.

At operation 825, the UE 102 may receive the PDSCH. In some embodiments, the UE 102 may receive the PDSCH from the gNB 105, although the scope of embodiments is not limited in this respect.

In some embodiments, the PDCCH may indicate an MCS index for the PDSCH. The UE 102 may select an MCS table from a plurality of predetermined MCS tables. Each of the MCS tables may be indexed by a range of MCS indexes. Each of the MCS indexes may be mapped to a modulation order and a coding rate. The same MCS table may be selected if: the UE 102 is configured with the MCS-C-RNTI and the RNTI that scrambles the PDCCH is the MCS-C-RNTI; or the UE 102 is not configured with the MCS-C-RNTI, a higher layer parameter mcs-Table of a PDSCH-Config IE is set to a value of "qam64LowSE," and the RNTI that scrambles the PDSCH is the C-RNTI. In some embodiments, the UE 102 may, from the selected MCS table, determine the modulation order and coding rate that correspond to the MCS index indicated by the PDCCH; and may decode the PDSCH in accordance with the determined modulation order and coding rate.

At operation 830, the UE 102 may receive a PUCCH. In some embodiments, the UE 102 may receive the PUCCH from the gNB 105, although the scope of embodiments is not limited in this respect. In some embodiments, the PUCCH may schedule a PUSCH. In some embodiments, the PUCCH may include information related to the PUSCH, including but not limited to time resources for the PUSCH, frequency resources for the PUSCH, modulation coding scheme (MCS) index for the PUSCH, and/or other parameter(s). In some embodiments, the PUCCH may include other information that may not necessarily be related to the PUSCH.

At operation 835, the UE 102 may determine one or more parameters related to PT-RSs for a PUSCH. At operation 840, the UE 102 may determine one or more parameters related to antenna ports for the PUSCH.

At operation 845, the UE 102 may transmit the PUSCH. In some embodiments, the UE 102 may transmit the PUSCH to the gNB 105, although the scope of embodiments is not limited in this respect.

In some embodiments, the UE 102 may receive (from the gNB 105 or from another device/component) one or more RRC messages that include a DM-RS Uplink Configuration (DMRS-UplinkConfig) IE. The UE 102 may receive a PUCCH that schedules a PUSCH. A CRC of the PUCCH may be scrambled by an RNTI. For clarity, the RNTI that scrambles the CRC of the PUCCH may be referred to as a second RNTI and the RNTI that scrambles the CRC of the PDCCH may be referred to as a first RNTI. The UE 102 may transmit the PUSCH. The UE 102 may encode one or more PT-RSs for transmission in the PUSCH if the second RNTI is the MCS-C-RNTI, the C-RNTI, the CS-RNTI, or a semi-persistent (SP) channel state information (CSI) RNTI (SP-CSI-RNTI). The UE 102 may refrain from transmission of the PT-RSs in the PUSCH if the second RNTI is not the MCS-C-RNTI, the C-RNTI, the CS-RNTI, or the SP-CSI-RNTI.

It should be noted that the first and second RNTIs (described above) may be different in some cases. The scope of embodiments is not limited in this respect, however. In some cases, the first and second RNTIs may be the same In some embodiments, the UE 102 may receive RRC signaling that configures an uplink grant. The RRC signaling may be configurable to indicate a port association parameter related to an association between antenna ports of PT-RSs and DM-RSs. The UE 102 may receive signaling that configures one or more antenna ports for the DM-RSs. The UE 102 may determine an antenna port for the PT-RSs based at least partly on a predetermined mapping between the port association parameter and antenna ports scheduled for the DM-RSs.

In a non-limiting example, one value of the port association parameter indicates that a first scheduled antenna port for the DM-RSs is to be used as the antenna port for the PT-RSs; another value of the port association parameter indicates that a second scheduled antenna port for the DM-RSs is to be used as the antenna port for the PT-RSs; another value of the port association parameter indicates that a third scheduled antenna port for the DM-RSs is to be used as the antenna port for the PT-RSs; another value of the port association parameter indicates that a fourth scheduled antenna port for the DM-RSs is to be used as the antenna port for the PT-RSs.

In some embodiments, if the association between the antenna ports of the PT-RSs and the DM-RSs is not configured by the RRC signaling, and if usage of the PT-RSs is enabled: the UE 102 may determine the antenna port for the PT-RSs based on a default value for the mapping between the port association parameter and the antenna ports scheduled for the DM-RSs.

In some embodiments, an apparatus of a UE 102 may comprise memory. The memory may be configurable to store at least a portion of the PDCCH. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to decode the PDCCH. The apparatus may include a transceiver to receive the PDCCH. The transceiver may transmit and/or receive other blocks, messages and/or other elements.

At operation 905, the gNB 105 may transmit one or more RRC messages, control messages and/or other messages. In some embodiments, the gNB 105 may transmit the one or more RRC messages, control messages and/or other messages to the UE 102, although the scope of embodiments is not limited in this respect.

At operation 910, the gNB 105 may determine one or more parameters related to PT-RSs for a PDSCH. At operation 915, the gNB 105 may determine one or more parameters related to antenna ports for the PDSCH.

At operation 920, the gNB 105 may transmit a PDCCH. In some embodiments, the gNB 105 may transmit the PDCCH to the UE 102, although the scope of embodiments is not limited in this respect.

At operation 925, the gNB 105 may transmit the PDSCH. In some embodiments, the gNB 105 may transmit the PDSCH to the UE 102, although the scope of embodiments is not limited in this respect.

At operation 930, the gNB 105 may determine one or more parameters related to PT-RSs for a PUSCH. At operation 935, the gNB 105 may determine one or more parameters related to antenna ports for the PUSCH.

At operation 940, the gNB 105 may transmit a PUCCH. In some embodiments, the gNB 105 may transmit the PUCCH to the UE 102, although the scope of embodiments is not limited in this respect.

At operation 945, the gNB 105 may transmit a PUSCH. In some embodiments, the gNB 105 may transmit the PUSCH to the UE 102, although the scope of embodiments is not limited in this respect.

In some embodiments, the gNB 105 may transmit a PUCCH that schedules a PUSCH. The gNB 105 may scramble a CRC of the PUCCH by an RNTI. The gNB 105 may determine whether the PUSCH is to include PT-RSs based at least partly on the RNTI that scrambles the CRC of the PUCCH. If the RNTI that scrambles the CRC of the PUCCH is an MCS-C-RNTI, a C-RNTI, a CS-RNTI, or an SP-CSI-RNTI: the gNB 105 may determine that one or more PT-RSs are present in the PUSCH. If the RNTI that scrambles the CRC of the PUCCH is not the MCS-C-RNTI, the C-RNTI, the CS-RNTI, or the SP-CSI-RNTI: the UE 102 may determine that PT-RSs are not present in the PUSCH.

In a non-limiting example, the RNTI that scrambles the PUCCH will be referred to as a first RNTI, for clarity. The gNB 105 may transmit a PDCCH that schedules a PDSCH. The gNB 105 may scramble a CRC of the PDCCH by a second RNTI. The gNB 105 may encode the PDSCH for transmission, and may determine whether to include one or more PT-RSs in the PDSCH based at least partly on the second RNTI. It should be noted that the first and second RNTIs may be different in some cases. The scope of embodiments is not limited in this respect, however. In some cases, the first and second RNTIs may be the same.

In some embodiments, an apparatus of a gNB 105 may comprise memory. The memory may be configurable to store the PDCCH. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to encoding of the PDCCH. The apparatus may include a transceiver to transmit the PDCCH. The transceiver may transmit and/or receive other blocks, messages and/or other elements.

Figure 10:
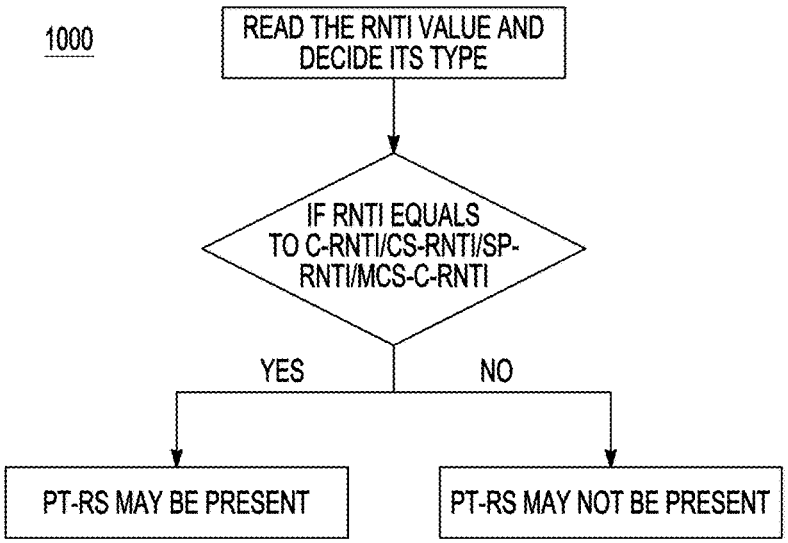
FIG. 10 illustrates a procedure to determine dynamic presence of phase tracking reference signals (PT-RSs) for ultra-reliable low-latency communication (URLLC) in accordance with some embodiments.
Figure 11:
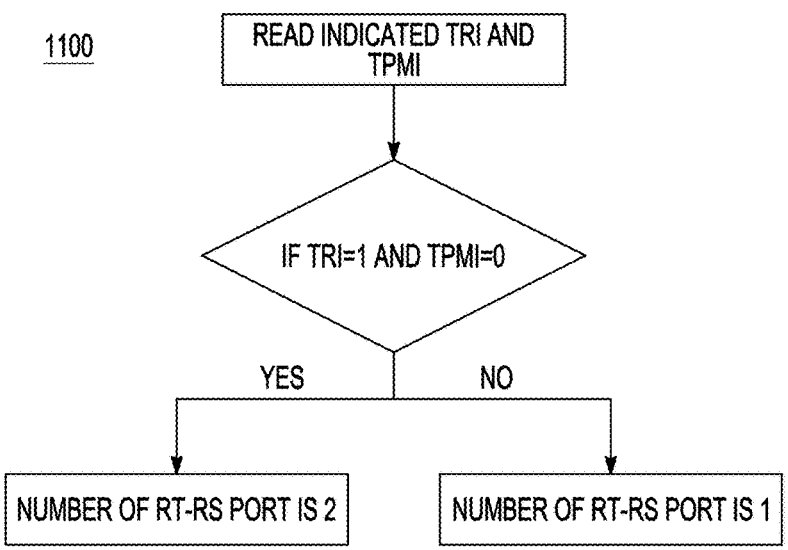
FIG. 11 illustrates a procedure to determine a number of PT-RS antenna ports for a 2-port uplink transmission in accordance with some embodiments.

FIG. 10 illustrates a procedure to determine dynamic presence of phase tracking reference signals (PT-RSs) for ultra-reliable low-latency communication (URLLC) in accordance with some embodiments. FIG. 11 illustrates a procedure to determine a number of PT-RS antenna ports for a 2-port uplink transmission in accordance with some embodiments.

It should be noted that the examples shown in FIGS. 10-11 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 10-11. Although some of the elements shown in the examples of FIGS. 10-11 may be included in a 3GPP standard, 3GPP LTE standard, NR standard, 5G standard and/or other standard, embodiments are not limited to usage of such elements that are included in standards.

In some embodiments, a method for PT-RS dynamic presence in URLLC and port indication may be used. In LTE Rel-15, phase tracking reference signal (PT-RS) can be present for eMBB when Radio Network Temporary ID (RNTI), which is used to scramble the Downlink Control Information (DCI) or to determine the Cyclic Redundant Code (CRC) mask for the PDCCH or configured in configured-grant based transmission, equals to a C-RNTI, CS-RNTI or SP-CSI-RNTI. However in URLLC, there could be a new type of RNTI, which is used to determine which MCS table should be used. This RNTI may be called as "MCS-C-RNTI" or "U-C-RNTI". In some cases, it may be called an "MCS-C-RNTI". Then whether PT-RS should be dynamically present when MCS-C-RNTI is used could be one issue.

In addition, for uplink non-codebook based transmission, the PT-RS port index is configured per SRS resource, and a UE 102 can be configured with up to 4 SRS resources and 1 SRS resource set. But to support uplink multi-panel transmission, more SRS resource sets may be configured, which can be used for one panel. Then how to configure the PT-RS port index when multiple SRS resource sets for non-codebook based transmission is configured could be one issue.

Further, for uplink codebook based transmission, the number of PT-RS port is determined by the precoder. For 4-port transmission, it has been defined that one PT-RS port is associated with SRS port 0 and 2 and another PT-RS port is associated with SRS port 1 and 3, when 2 PT-RS antenna port is configured. If any of the port is non-zero-power (NZP), corresponding PT-RS port will be present. However, for 2-port transmission, how to determine the number of PT-RS port could be another issue.

In some embodiments, methods to determine the dynamic presence of PT-RS for URLLC and to indicate the number of PT-RS antenna ports (APs) for codebook and non-codebook based transmission may be used, which may be related to one or more of: dynamic presence of PT-RS when MCS-C-RNTI is scheduled; PT-RS port index indication when multiple SRS resource sets is configured; PT-RS port determination for 2-port transmission; and/or other.

Some embodiments may be related to dynamic Presence of PT-RS in URLLC. In some embodiments, in URLLC, MCS-C-RNTI may be used to scramble the DCI, which implies a MCS table for 64QAM with low spectrum efficiency. In some embodiments, when MCS-C-RNTI is used to scramble DCI, the PT-RS can be dynamically present if configured. In one example, the following can be specified. In some alternative embodiments, PT-RS may not be present if RNTI equals to MCS-C-RNTI.

In some embodiments, if a UE 102 is not configured with the higher layer parameter phaseTrackingRS in DMRS-UplinkConfig, the UE 102 shall not transmit PT-RS. The PTRS may only be present if RNTI equals MCS-C-RNTI, C-RNTI, CS-RNTI, or SP-CSI-RNTI.

In some embodiments, if a UE 102 is configured with the higher layer parameter phaseTrackingRS in DMRS-DownlinkConfig. A) The higher layer parameters timeDensity and frequencyDensity in PTRS-DownlinkConfig indicate the threshold values ptr s-MCS$_i$, i=1,2,3 and N$_{RB,i}$, i=0,1, (which may be shown in Table 5.1.6.3-1 and Table 5.1.6.3-2 of 3GPP standard TS 38.214, respectively, although the scope of embodiments is not limited in this respect). B) If either or both of the additional higher layer parameters timeDensity and frequencyDensity are configured, and the RNTI equals MCS-C-RNTI, C-RNTI or CS-RNTI, the UE 102 shall assume the PT-RS antenna ports' presence and pattern are a function of the corresponding scheduled MCS of the corresponding codeword and scheduled bandwidth in corresponding bandwidth part (which may be shown in Table 5.1.6.3-1 and Table 5.1.6.3-2 of 3GPP standard TS 38.214, although the scope of embodiments is not limited in this respect). If the higher layer parameter timeDensity given by PTRS-DownlinkConfig is not configured, the UE shall assume L$_{PT-RS}$=1. If the higher layer parameter frequencyDensity given by PTRS-DownlinkConfig is not configured, the UE 102 shall assume K$_{PT-RS}$=2. C) Otherwise, if neither of the additional higher layer parameters timeDensity and frequencyDensity are configured and the RNTI equals MCS-C-RNTI or C-RNTI or CS-RNTI, the UE 102 shall assume the PT-RS is present with L$_{PT-RS}$=1, K$_{PT-RS}$=2.

FIG. 10 illustrates a non-limiting example of a procedure 1000 to determine the dynamic presence of PT-RS for URLLC when PT-RS is enabled. In some embodiments, the procedure 1000 may be used to determine dynamic presence of PT-RS for URLLC when it is enabled, although the scope of embodiments is not limited in this respect.

In some embodiments, one or more techniques for PT-RS port indication and/or determination may be used.

In some embodiments, for codebook based transmission, when number of SRS antenna ports for the indicated SRS resource may be configured to be 2 or less than 2, single PT-RS port may be used. Alternatively, for 2 SRS ports case, number of PT-RS ports can be determined by the indicated TPMI and TRI: if TRI=1 and TPMI=0 is indicated, which is used for non-coherent based transmission with both antenna ports, two PT-RS ports shall be used; otherwise single PT-RS port shall be used.

FIG. 11 illustrates a non-limiting example procedure to determine number of PT-RS antenna ports for 2 port case when codebook based transmission scheme is configured and maximum number of PT-RS ports is 2. In some embodiments, the procedure 1100 may be used to determine a number of PT-RS antenna ports for 2 port uplink codebook based transmission when maximum number of PT-RS ports is 2, although the scope of embodiments is not limited in this respect.

In some embodiments, if a maximum number of PT-RS ports is smaller than a number that the UE 102 reported, the UE 102 shall expect that the gNB 105 should not indicate corresponding precoder that requires more PT-RS ports based on the number of PT-RS antenna ports it reported. Alternatively, the UE 102 shall expect that the maximum number of PT-RS ports should be equal to the number that the UE 102 reported if PT-RS is enabled.

In some embodiments, when DCI format 0_0 is used to schedule an uplink transmission, single PT-RS port shall be used, and the PT-RS is associated with the Demodulation Reference Signal (DMRS) port.

In some embodiments, the UE 102 shall expect the PT-RS port index configured in each SRS resources in a resource set for non-codebook based transmission should be the same. Then to support multi-panel transmission, the gNB 105 can configure multiple SRS resource sets, where each resource set can be associated with one UE antenna panel.

In some embodiments, for configured grant based transmission, wherein the uplink grant is configured by RRC signaling instead of Downlink Control Information (DCI), if the PT-RS and DMRS port association is not configured but PT-RS is enabled, the UE 102 shall assume a default association between PT-RS port and DMRS port. The default association could be based on a default value of the PTRS-DMRS association indication as shown in the example tables below, Table 1 and Table 2. The scope of embodiments is not limited to the values shown in those tables. In one example, the default value could be 0, which indicates when single PT-RS port is configured, PT-RS is associated with the first scheduled DMRS port, and when two PT-RS ports are configured, the first PT-RS port is associated with the first DMRS port which shares PT-RS port 0 and the second PT-RS port is associated with the second DMRS port which shares PT-RS port 1.

Table 1 below illustrates a non-limiting example of PTRS-DMRS association for UL PTRS port 0.

| Value | DMRS port |
|---|---|
| 0 | $1^{st}$ scheduled DMRS port |
| 1 | $2^{nd}$ scheduled DMRS port |
| 2 | $3^{rd}$ scheduled DMRS port |
| 3 | $4^{th}$ scheduled DMRS port |

Table 2 below illustrates a non-limiting example of PTRS-DMRS association for UL PTRS ports 0 and 1. The scope of embodiments is not limited to the values shown in those tables.

| Value of MSB | DMRS port | Value of LSB | DMRS port |
|---|---|---|---|
| 0 | $1^{st}$ DMRS port which shares PTRS port 0 | 0 | $1^{st}$ DMRS port which shares PRTS port 1 |
| 1 | $2^{nd}$ DMRS port which shares PTRS port 0 | 1 | $2^{nd}$ DMRS port which shares PTRS port 1 |

In another option, for configured grant based transmission, if the PT-RS and DMRS port association is not configured but PT-RS is enabled, the UE 102 shall not transmit PT-RS. In yet another option, for configured grant based transmission, if PT-RS is enabled, the UE 102 shall expect the PT-RS and DMRS port association should be configured.

In some embodiments, the UE 102 may determine the dynamic presence of phase tracking reference signal (PT-RS) based on the radio network temporary ID (RNTI) for modulation and coding scheme (MCS) table selection. In some embodiments, when the RNTI used to indicate a MCS table is applied to the cyclic redundant code (CRC) mask, the PT-RS may be present if PT-RS is enabled. In some embodiments, when the RNTI used to indicate a MCS table is applied to the cyclic redundant code (CRC) mask, the PT-RS should not be present.

In some embodiments, the UE 102 may determine the number of uplink PT-RS ports for uplink codebook and non-codebook based transmission. In some embodiments, for 2 port based codebook based transmission, single PT-RS port could be used if PT-RS is enabled. In some embodiments, for 2 port based codebook based transmission, if Transmission Rank Indicator (TRI)=1 and Transmission Precoder Matrix Index (TPMI)=0 is indicated, two PT-RS ports shall be used; otherwise single PT-RS port shall be used. In some embodiments, if the maximum number of PT-RS ports is smaller than the number of PT-RS ports that the UE 102 reported, the UE 102 shall expect that the gNB 105 should not indicate corresponding precoder that requires more PT-RS ports based on the number of PT-RS antenna ports it reported. In some embodiments, the UE 102 shall expect that the maximum number of PT-RS ports should be equal to the number of PT-RS ports that the UE 102 reported if PT-RS is enabled.

In some embodiments, when DCI format 0_0 is used to schedule an uplink transmission, single PT-RS port shall be used, and the PT-RS is associated with the Demodulation Reference Signal (DMRS) port. In some embodiments, the UE 102 shall expect the PT-RS port index configured in each SRS resources in a resource set for non-codebook based transmission should be the same. In some embodiments, wherein the UE 102 shall expect the PT-RS port index configured in each SRS resources in different resource set for non-codebook based transmission should be different. In some embodiments, for configured grant based transmission, if the PT-RS and DMRS port association is not configured but PT-RS is enabled, the UE 102 shall assume a default association between PT-RS port and DMRS port. In some embodiments, the default association could be based on a default value of the PTRS-DMRS association indication. In some embodiments, the PTRS-DMRS association may be based on the indication for grant based transmission.

In some embodiments, for configured grant based transmission, if the PT-RS and DMRS port association is not configured but PT-RS is enabled, the UE 102 shall not transmit PT-RS. In some embodiments, for configured grant based transmission, if PT-RS is enabled, the UE 102 shall expect the PT-RS and DMRS port association should be configured.

As described herein, the MCS-C-RNTI may be a unique UE identifier used to indicate usage, for the PDSCH and/or PUSCH), of an alternative MCS table based on 64QAM. In a non-limiting example, the alternative MCS table may be "MCS Table 3" described herein. In some embodiments, the alternative MCS table may be selected from a plurality of candidate MCS tables that includes "MCS Table 1," "MCS Table 2," and "MCS Table 3." The plurality of candidate MCS tables may be included in a 3GPP standard and/or NR standard, in some embodiments. The scope of embodiments is not limited to any of the following: usage of "MCS Table 3" as the alternative MCS table; usage of three candidate MCS tables; usage of "MCS Table 1," "MCS Table 2," and "MCS Table 3" as the candidate MCS tables; example MCS tables described herein; MCS tables included in a standard; and/or other.

In some embodiments, the MCS tables may be included in a 3GPP standard, NR standard and/or other standard. In a non-limiting example, "MCS Table 1" may be the same as or similar to Table 5.1.3.1-1 of TS 38.214 v15.3.0, "MCS Table 2" may be the same as or similar to Table 5.1.3.1-2 of TS 38.214 v15.3.0, and "MCS Table 3" may be the same as or similar to Table 5.1.3.1-3 of TS 38.214 v15.3.0.

Table 5.1.3.1-1 of TS 38.214 v15.3.0 is given below.

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |

-continued

| MCS Index $I_{MCS}$ | Modulation Order $Q_m$ | Target code Rate R × [1024] | Spectral efficiency |
|---|---|---|---|
| 28 | 6 | 948 | 5.5547 |
| 29 | 2 | reserved | |
| 30 | 4 | reserved | |
| 31 | 6 | reserved | |

Table 5.1.3.1-2 of TS 38.214 v15.3.0 is given below.

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

Table 5.1.3.1-3 of TS 38.214 v15.3.0 is given below.

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
at least one processor configured to cause a user equipment (UE) to:
decode one or more radio resource control (RRC) messages that include:
a Demodulation Reference Signal (DM-RS) Downlink Configuration (DMRS-DownlinkConfig) information element (IE), and
a Phase Tracking Reference Signal (PT-RS) Downlink Configuration (PTRS-DownlinkConfig) IE;
decode a physical downlink control channel (PDCCH) that schedules a physical downlink shared channel (PDSCH), wherein a cyclic redundancy check (CRC) of the PDCCH is scrambled by a radio network temporary identifier (RNTI);
wherein if:
the UE is configured with a higher layer parameter phaseTrackingRS in the DMRS-DownlinkConfig IE,
neither of higher layer parameters timeDensity and frequencyDensity are configured by the PTRS-DownlinkConfig IE, and
the RNTI that scrambles the PDCCH is a modulation coding scheme (MCS) cell RNTI (MCS-C-RNTI),
the at least one processor is configured to determine that:
one or more PT-RSs are present in the PDSCH,
a time density parameter of the PDSCH is equal to one, indicating that one symbol per PDSCH includes a PT-RS, and
a frequency density parameter of the PDSCH is equal to two, indicating that one resource element (RE) per two resource blocks (RBs) includes a PT-RS.

2. The apparatus according to claim 1, wherein:
if the UE is configured with the higher layer parameter phaseTrackingRS in the DMRS-DownlinkConfig IE, and if either or both of the higher layer parameters timeDensity and frequencyDensity are configured by the PTRS-DownlinkConfig IE, and if the RNTI that scrambles the PDCCH is the MCS-C-RNTI, a C-RNTI, or a CS-RNTI, the at least one processor is configured to determine that:
the presence of antenna ports and a pattern of the antenna ports are a function of a scheduled MCS of a corresponding codeword of the PDSCH and a scheduled bandwidth in a corresponding bandwidth part.

3. The apparatus according to claim 1, wherein the RNTI that scrambles the PDCCH is a first RNTI, the one or more RRC messages further includes a DM-RS Uplink Configuration (DMRS-UplinkConfig) IE, and the at least one processor is further configured to:
decode a physical uplink control channel (PUCCH) that schedules a physical uplink shared channel (PUSCH), wherein a CRC of the PUCCH is scrambled by a second RNTI;
encode the PUSCH for transmission, wherein the at least one processor is further configured to:
encode one or more PT-RSs for transmission in the PUSCH if the second RNTI is the MCS-C-RNTI, a C-RNTI, a CS-RNTI, or a semi-persistent (SP) channel state information (CSI) RNTI (SP-CSI-RNTI); and refrain from transmission of the PT-RSs in the PUSCH if the second RNTI is not the MCS-C-RNTI, the C-RNTI, the CS-RNTI, or the SP-CSI-RNTI.

4. The apparatus according to claim 1, wherein: the time density parameter $L_{PT-RS}$ indicates a number of symbols of the PDSCH that include at least one PT-RS, and the frequency density parameter $K_{PT-RS}$ indicates a value for which, in the PDSCH, one RE per $K_{PT-RS}$ RBs includes a PT-RS.

5. The apparatus according to claim 1, wherein: the MCS-C-RNTI is a unique UE identifier used to indicate usage, for the PDSCH and/or physical uplink shared channel (PUSCH), of an alternative MCS table based on 64 level quadrature amplitude modulation (64QAM).

6. The apparatus according to claim 1, wherein: the PDCCH indicates an MCS index for the PDSCH, the at least one processor is further configured to:
select an MCS table from a plurality of predetermined MCS tables, wherein each of the MCS tables is indexed by a range of MCS indexes, wherein each of the MCS indexes is mapped to a modulation order and a coding rate, wherein the same MCS table is selected if:
the UE is configured with the MCS-C-RNTI and the RNTI that scrambles the PDCCH is the MCS-C-RNTI, or the UE is not configured with the MCS-C-RNTI, a higher layer parameter MCS-Table of a PDSCH-Config IE is set to a value of "qam64LowSE," and the RNTI that scrambles the PDSCH is the C-RNTI.

7. The apparatus according to claim 6, wherein the at least one processor is further configured to:
determine, from the selected MCS table, the modulation order and coding rate that correspond to the MCS index indicated by the PDCCH; and
decode the PDSCH in accordance with the determined modulation order and coding rate.

8. The apparatus according to claim 1, wherein the at least one processor is further configured to:
determine a dynamic presence of the PT-RSs based on the type of RNTI that scrambles the PDCCH.

9. The apparatus according to claim 1, wherein the at least one processor is further configured to:
determine a number of antenna ports for the PT-RSs based on the type of RNTI that scrambles the PDCCH.

10. The apparatus according to claim 1, wherein the UE is configured to operate in accordance with an ultra-reliable low-latency communication (URLLC) technique.

11. The apparatus of claim 1, wherein:
the at least one processor includes a baseband processor to decode the PDCCH; and the apparatus further comprises a transceiver to receive the PDCCH.

12. A non-transitory computer-readable storage medium storing program instructions executable by at least one processor to cause a user equipment (UE) to:
decode one or more radio resource control (RRC) messages that include:
a Demodulation Reference Signal (DM-RS) Downlink Configuration (DMRS-DownlinkConfig) information element (IE), and
a Phase Tracking Reference Signal (PT-RS) Downlink Configuration (PTRS-DownlinkConfig) IE;
decode a physical downlink control channel (PDCCH) that schedules a physical downlink shared channel (PDSCH), wherein a cyclic redundancy check (CRC) of the PDCCH is scrambled by a radio network temporary identifier (RNTI);
wherein if:
the UP is configured with a higher layer parameter phaseTrackingRS in the DMRS-DownlinkConfig IE,
neither of higher layer parameters timeDensity and frequencyDensity are configured by the PTRS-DownlinkConfig IE, and
the RNTI that scrambles the PDCCH is a modulation coding scheme (MCS) cell RNTI (MCS-C-RNTI),
the at least one processor is configured to determine that:
one or more PT-RSs are present in the PDSCH,
a time density parameter of the PDSCH is equal to one, indicating that one symbol per PDSCH includes a PT-RS, and
a frequency density parameter of the PDSCH is equal to two, indicating that one resource element (RE) per two resource blocks (RBs) includes a PT-RS.

13. The non-transitory computer-readable storage medium of claim 12, wherein:
if the UE is configured with the higher layer parameter phaseTrackingRS in the DMRS-DownlinkConfig IE, and if either or both of the higher layer parameters timeDensity and frequencyDensity are configured by the PTRS-DownlinkConfig IE, and if the RNTI that scrambles the PDCCH is the MCS-C-RNTI, a C-RNTI, or a CS-RNTI, the at least one processor is configured to determine that;
the presence of antenna ports and a pattern of the antenna ports are a function of a scheduled MCS of a corresponding codeword of the PDSCH and a scheduled bandwidth in a corresponding bandwidth part.

14. The non-transitory computer-readable storage medium of claim 12, wherein the PDCCH indicates are MCS index for the PDSCH, and the program instructions are further executable to:
select an MCS table from a plurality of predetermined MCS tables, wherein each of the MCS tables is indexed by a range of MCS indexes, wherein each of the MCS indexes is mapped to a modulation order and a coding rate, wherein the same MCS table is selected if:
the UE is configured with the MCS-C-RNTI and the RNTI that scrambles the PDCCH is the MCS-C-RNTI, or the UE is not configured with the MCS-C-RNTI, a higher layer parameter MCS-Table of a PDSCH-Config IE is set to a value of "qam64LowSE," and the RNTI that scrambles the PDSCH is the C-RNTI.

15. The non-transitory computer-readable storage medium of claim 14, wherein the program instructions are further executable to:

determine, from the selected MCS table, the modulation order and coding rate that correspond to the MCS index indicated by the PDCCH; and
decode the PDSCH in accordance with the determined modulation order and coding rate.

16. The non-transitory computer-readable storage medium of claim 12, wherein the program instructions are further executable to:
determine a dynamic presence of the PT-RSs based on the type of RNTI that scrambles the PDCCH.

17. The non-transitory computer-readable storage medium of claim 12, wherein the program instructions are further executable to:
determine a number of antenna ports for the PT-RSs based on the type of RNTI that scrambles the PDCCH.

18. A user equipment (TIE), comprising:
wireless communication circuitry; and
at least one processor coupled to the wireless communication circuitry, wherein the at least one processor is configured to cause the UE to:
  decode one or more radio resource control (RRC) messages that include:
    a Demodulation Reference Signal (DM-RS) Downlink Configuration (DMRS-DownlinkConfig) information element (IE), and
    a Phase Tracking Reference Signal (PT-RS) Downlink Configuration (PTRS-DownlinkConfig) IE;
  decode a physical downlink control channel (PDCCH) that schedules a physical downlink shared channel (PDSCH), wherein a cyclic redundancy check (CRC) of the PDCCH is scrambled by a radio network temporary identifier (RNTI);
wherein if:
  the UE is configured with a higher layer parameter phaseTrackingRS in the DMRS-DownlinkConfig IE,
  neither of higher layer parameters timeDensity and frequencyDensity are configured by the PTRS-DownlinkConfig IE, and
  the RNTI that scrambles the PDCCH is a modulation coding scheme (MCS) cell RNTI (MCS-C-RNTI),
determine that:
  one or more PT-RSs are present in the PDSCH,
  a time density parameter of the PDSCH is equal to one, indicating that one symbol per PDSCH includes a PT-RS, and
  a frequency density parameter of the PDSCH is equal to two, indicating that one resource element (RE) per two resource blocks (RBs) includes a PT-RS.

19. The UE of claim 18, wherein the MCS-C-RNTI is a unique UE identifier used to indicate usage, for the PDSCH and/or physical uplink shared channel (PUSCH), of an alternative MCS table based on 64 level quadrature amplitude modulation (64QAM).

20. The UE of claim 18, wherein the at least one processor is further configured to cause the UE to:
if the UE is configured with the higher layer parameter phaseTrackingRS in the DMRS-DownlinkConfig IE, and if either or both of the higher layer parameters timeDensity and frequencyDensity are configured by the PTRS-DownlinkConfig IE, and if the RNTI that scrambles the PDCCH is the MCS-C-RNTI, a C-RNTI, or a CS-RNTI,
determine that:
the presence of antenna ports and a pattern of the antenna ports are a function of a scheduled MCS of a corresponding codeword of the PDSCH and a scheduled bandwidth in a corresponding bandwidth part.

* * * * *